March 28, 1967 — L. L. PREISS — 3,310,823
CONVEYANCE GANGWAY WITH LEVELING SYSTEM
Filed Nov. 12, 1964 — 3 Sheets-Sheet 1

INVENTORS
LESTER L. PREISS
BY
Shanley & O'Neil
ATTORNEY

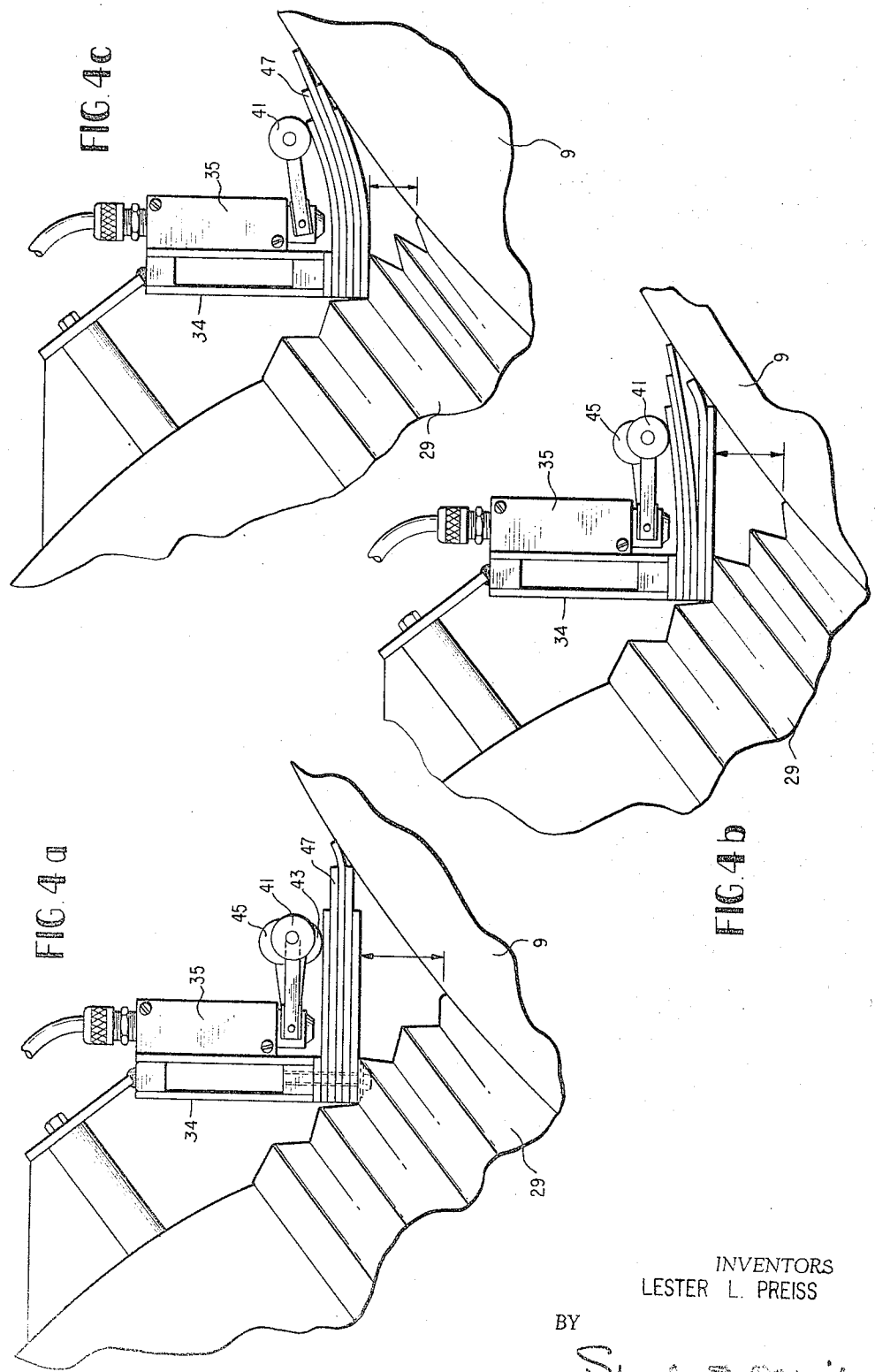

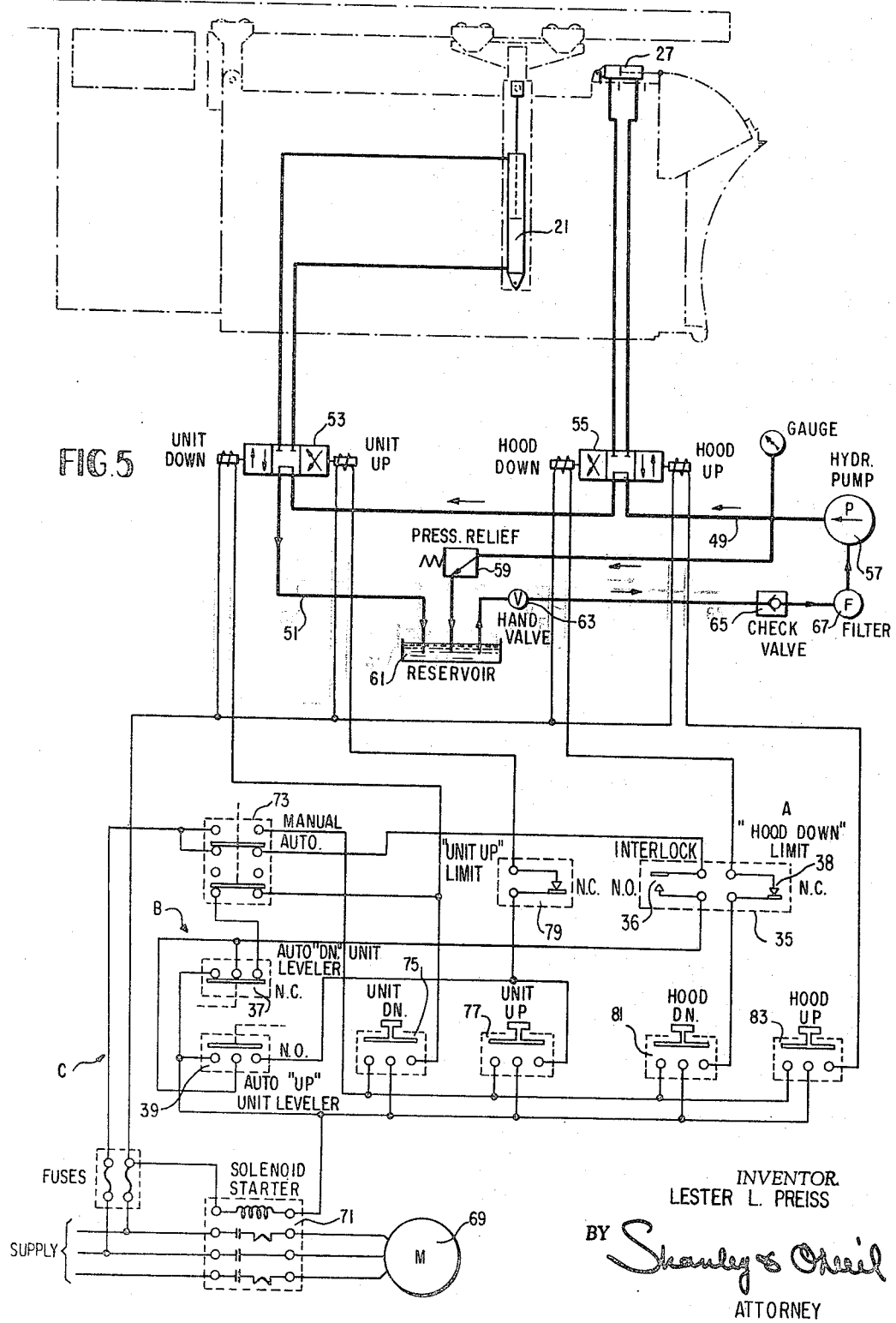

United States Patent Office 3,310,823
Patented Mar. 28, 1967

3,310,823
CONVEYANCE GANGWAY WITH LEVELING SYSTEM
Lester L. Preiss, Miami, Fla., assignor to Wollard Aircraft Service Equipment Inc., a corporation of Florida
Filed Nov. 12, 1964, Ser. No. 412,876
11 Claims. (Cl. 14—71)

This patent application is a continuation-in-part of patent application Ser. No. 363,504, filed Apr. 29, 1964, now abandoned.

The present invention relates to passenger gangways, more particularly of the type in which an elongated gangway provides covered and weather-proof protection for passengers walking through the gangway, between an elevated door of a terminal building such as an aircraft terminal and an elevated door of a conveyance such as an aircraft that is loading or unloading passengers.

In addition to protecting passengers from the weather, gangways such as those of the present invention are also intended to shield the passengers from noise and jet blasts and to enable them to avoid oil slicks. Gangways according to the present invention also remove any uncertainty as to which of several vehicles undergoing loading the passenger is to enter.

Gangways very broadly similar to the present invention have previously been proposed. However, these gangways have in the past suffered from the great disadvantages that they do not always register well with the doors of the vehicle. When a vehicle such as an aircraft is being loaded or unloaded, the change in weight of the vehicle causes the vehicle to ride higher or lower on its landing gear or other support, with the result that the vehicle door and the gangway become misaligned.

Accordingly, it is an object of the present invention to provide conveyance loading apparatus adapted to register with conveyance doors in any of a plurality of positions of the conveyance.

Another object of the present invention is the provision of conveyance loading apparatus that is structurally strong an yet light in weight.

Still another object of the present invention is the provision of conveyance loading apparatus that automatically remains in register with a selected conveyance door.

Finally, it is an object of the present invention to provide conveyance loading apparatus that will be relatively simple and inexpensive to manufacture, easy to construct, install, operate, maintain and repair, and rugged and durable in use.

Other objects and advantages of the present invention will become apparent from a consideration of the following description, taken in connection with the accompanying drawings, in which:

FIGURES 4a, 4b and 4c are fragmentary cross-sectional views taken on the line 4—4 of FIGURE 2 but showing the various actuating mechanisms of the present invention in different operative positions; and FIGURE 5 is a schematic fluid and electrical circuit diagram showing the interaction of various components of a passenger gangway according to the present invention.

Figure 1:
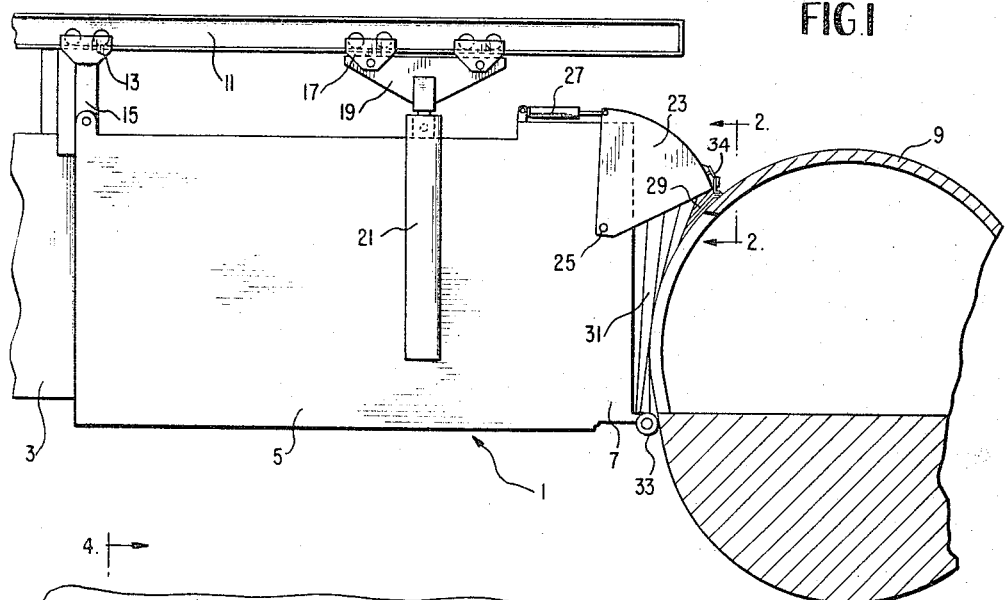
FIGURE 1 is a side elevational view of a passenger gangway according to the present invention, in register with the open door of a vehicle such as an aircraft.
Figure 2:
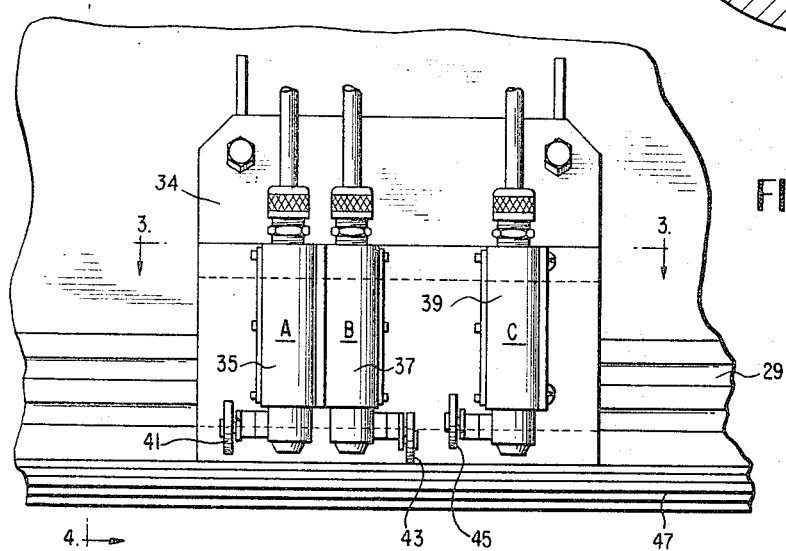
FIGURE 2 is an enlarged fragmentary cross-sectional elevational view taken on the line 2—2 of FIGURE 1.
Figure 3:
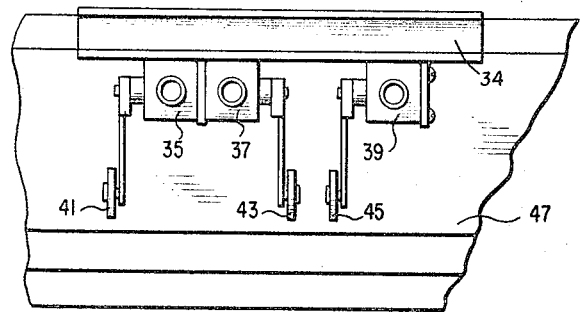
FIGURE 3 is a horizontal cross-sectional view taken on the line 3—3 of FIGURE 2.

Referring now to the drawings in greater detail, there is shown a passenger gangway indicated generally at 1, which is generally elongated and consists of a fixed inner end or terminal portion 3 attached to the side of a terminal building such as an airport or the like (not shown). Terminal portion 3 registers with a doorway providing an exit from the terminal building and comprises in unitary assembly a floor and sidewalls and an endwall and a roof. Gangway 1 also comprises an elongated midportion 5 open at its front and rear ends and having a floor and sidewalls and a roof. The outer or open end of terminal portion 3 is disposed within the inner or terminal end of elongated midportion 5. A vestibule 7 is disposed at the outer end of midportion 5 and provides an endwise outwardly extending continuation of midportion 5. Vestibule 7 has mounting means (not shown) by which it is mounted for rotation on and relative to midportion 5 about a vertical axis that lies in the longitudinal vertical midplane of midportion 5. Vestibule 7 at its outer end has a plurality of folding doors (not shown) by which access is selectively provided to an adjacent door of a vehicle 9 such as an aircraft or the like.

Midportion 5 and vestibule 7 are bodily longitudinally reciprocable horizontally as a unit relative to terminal portion 3. However, the movable or extensible parts of the gangway have no subjacent support. Instead, they are hung from an overhead trackway 11 that is horizontally disposed and that extends lengthwise parallel to gangway 1. A plurality of laterally spaced rear trolleys 13 ride on trackway 11. Inextensible hangers 15 depend from rear trolleys 13 and are pivotally interconnected with upper rear portion of midportion 5 at either side thereof. Forward trolleys 17 also ride on trackway 11 and support hangers 19 from which forward portions of midportion 5 and vestiblue 7 are supported through the agency of fluid motors 21 generally vertically disposed one on either side of midportion 5. Hangers 19 and fluid motors 21 are swingably interconnected, and fluid motors 21 are swingably interconnected with midportion 5 so that upon extension or retraction of fluid motors 21, midportion 5 and and vestibule 7 are supported through the agency of fluid provided by the pivotal connection between the upper rear portion of midportion 5 and the inextensible hangers 15.

The structure and support of terminal portion 3, midportion 5, vestibule 7, hangers 15 and 19, trolleys 17 and fluid motors 21 are disclosed in greater detail in the copending application of Joseph C. Wollard, John S. Slaney and Lester L. Preiss filed under even date herewith and entitled' "Extensible Passenger Gangway." Reference is made to this copending application for a fuller disclosure of these features so as to avoid the inclusion of unnecessary detail in the present application. Fluid motors 21 are also mechanically interconnected by rack and pinion means to assure that they extend and retract in registry with each other; and such rack and pinion interconnection of the fluid motors 21 is also disclosed in greater detail in the above-identified copending application.

Vestibule 7 is provided at its upper forward side with a protective hood 23 mounted for vertical swinging movement on vestibule 7 about a horizontal axis at 25. At least one fluid motor 27 is pivotally interconnected between vestibule 7 and hood 23 to swing hood 23 vertically. Hood 23 carries a bellows-type closure 29 along its forward edge. Flexible curtains 31 at either side of vestibule 7 are carried by the lower side edges of hood 23 and the forward vertical edges of vestibule 7. A bumper 33 extends along the forward lower edge of vestibule 7. All the material that contacts the vehicle is thus non-metallic and may for example be rubber or plastic or the like. All metallic parts of the passenger gangway are thus spaced from the vehicle to avoid grounding the vehicle through the gangway and vice versa.

The present invention provides a variety of controls for the position of the gangway and its hood. More particularly, the present invention provides means for assuring that once the gangway has been brought into proper registry with the vehicle door, rising or falling of the vehicle will not misalign the gangway and the vehicle. This desirable result is achieved by providing means responsive to pressure between the vehicle and the gangway, and more particularly between the vehicle and hood 23, to cause the gangway to rise when the pressure between the hood and the vehicle exceeds a predetermined maximum and fall when the pressure between the hood and the vehicle falls below a predetermined minimum, thereby to assure that the vehicle door and the gangway will never move substantially out of registry with each other.

To this end, there is provided a plurality of switches 35, 37 and 39 carried by a bracket or support 34 on the forward edge of hood 23. Switches 35, 37 and 39 have switch actuators 41, 43 and 45, respectively, of the pivotally-mounted arm type, spring-biased to a normal position and swingable to indicate relative movement of support 34 and the vehicle upon increase or decrease of pressure between hood 23 and the vehicle so as to open or close the associated switch. Switch 35 incorporates two sets of electrical contacts 36 and 38 (see FIG. 5) which are moved into and out of position by switch actuator 41, set of contacts 36 being in the normally open position and set of contacts 38 being in the normally closed position with movement of the actuator opening normally closed switch 38 while at the same time closing normally open switch 36. Switch 37 is normally closed and switch 39 is normally open. Sealing strips 47 are mounted on the same bracket 34 as switches 35, 37 and 39 and bear against the vehicle in sealing relationship therewith. Switch actuators 41, 43 and 45 bear against sealing strips 47 and are actuated one by one as the pressure between the sealing strips and the vehicle changes. Of course, switch actuators 41, 43 and 45, instead of bearing against sealing strips 47, could bear directly against vehicle 9.

The relationship of switch actuators 41, 43 and 45 to each other is best seen in FIGURES 4a, 4b and 4c. As is there shown, switch actuator 43 is the lowest of the three, actuator 41 is intermediate the elevation of the three and actuator 45 is the highest of the three. This means that as pressure between the hood and vehicle increases, switch actuator 43 will first be moved to actuate its associated switch 37 to open it. Then actuator 41 will be moved to actuate its associated switch 35 to open it. Finally, actuator 45 will be moved to actuate its associated switch 39 to close it. The actuators are shown in their normal or rest position in FIGURE 4a; in their position when actuator 43 has been moved to actuate switch 37 in FIGURE 4b; and in the position they normally occupy during most of the time when the gangway is in registry with the doorway of the vehicle in FIGURE 4c, with switch actuators 41 and 43 moved to open both of switches 35 and 37 but actuator 45 unmoved so that switch 39 remains open.

Turning now to FIGURE 5, the purpose and mode of actuation of the various components of the invention will become clear from a consideration of the sequence of operations using the present invention, as followed on the fluid circuit and electrical diagram of FIGURE 5. As is there shown, generally speaking, the fluid pressure system occupies the upper part of the diagram while the electrical system occupies the lower portion of the diagram. Fluid under pressure is supplied by a fluid supply conduit 49 to one side of fluid motors 21 and to one side of fluid motor 27. Return conduit 51 returns fluid from motors 21 and 27. A solenoid-actuated spool valve 53 controls the flow of fluid to and from or past fluid motors 21, while a similar solenoid-actuated spool valve 55 controls the flow of fluid to and from or past motor 27. A pump 57 pressurizes the fluid, and a pressure relief valve 59 downstream of pump 57 permits the by-pass of fluid under pressure from the pump back to the reservoir 61. A manual control valve 63 is operable to activate or de-activate the entire fluid system, while a check valve 65 opening toward pump 57 assures that pressure will not be lost upon the accidental cessation of pumping. A filter 67 is also provided in the hydraulic circuit. It is thus possible, by actuation of spool valves 53 and 55, to actuate fluid motors 21 in either direction so as to raise or lower the gangway or to by-pass motors 21 altogether; and it is possible by actuation of spool valve 53 to actuate fluid motor 27 to raise or lower hood 23 or to by-pass fluid motor 27 altogether.

The purpose of the electrical system that occupies the lower portion of FIGURE 5 is to actuate spool valves 53 and 55 in various ways thereby to actuate or by-pass fluid motors 21 and 27. To this end, there is provided a three-phase motor 69 controlled by a starter 71 in circuit with the power supply. Broadly, the operation of the present invention has two conditions: manual and automatic. To select the desired one of these two conditions, manual-automatic relay means are provided in the form of a double-pole-double-throw 73 which is shown in its automatic position in FIGURE 5 and which is movable to its other or manual position for manually controlled operation of the invention.

At the start of an operation according to the present invention, switch 73 is in manual position. A vehicle 9 such as an aircraft is taxied to a position adjacent gangway 1. With hood 23 fully raised, gangway 1 is then extended toward the aircraft by power extension means (not shown) disclosed in our copending application referred to above. When the gangway is extended at least most of the way toward the vehicle, the gangway is then vertically aligned with the door of the vehicle.

Vertical alignment, that is, the initial correct positioning of the level of the gangway relative to the vehicle door, is controlled manually. With switch 73 in manual position and hood 23 fully raised, one or another of a unit down switch 75 and a unit up switch 77 is manually operated. These switches and their function in the manually actuatable circuit are shown in FIGURE 5. They are both three-pole-single-throw or on-off switches. If the level of the gangway floor is substantially above the level of the vehicle floor, then unit down switch 75 is depressed, which actuates the solenoid at the unit down end of spool valve 53 and also actuates starter 71 to start up motor 69 to drive pump 57. Spool valve 55 is in the by-pass position shown in FIGURE 5, while spool 53 is in unit down position so that supply conduit 49 is in fluid communication with the lower end of fluid motors 21 and return conduit 51 is in fluid communication with the upper end of motors 21, so that the gangway is caused to swing downwardly. On the other hand, if the gangway floor is substantially below the level of the vehicle floor, then unit up switch 77 is actuated so that the unit up end of spool valve 53 is placed in fluid circuit between conduits 49 and 51 thereby to supply fluid to the upper end of fluid motors 21 and exhaust it from the lower end of fluid motors 21 thereby to cause the unit to rise relative to the vehicle. A normally closed limit switch 79 in the circuit to the unit up end of spool valve 53 is provided, to assure that the unit cannot be raised so far as to cause injury to itself or to other parts of the present invention.

After the gangway has been properly leveled by manual actuation of switches 75 and 77, so that the floor of the gangway is preferably flush with the floor of the vehicle, and any final extension of the gangway against the vehicle has been completed, then the hood 23 is lowered into the desired relationship with the vehicle by actuation of manually operated hood down switch 81. FIGURES 4a, 4b and 4c illustrate the sequence of events upon hood lowering movement. FIGURE 4a shows the position of the parts as the sealing strips 47 first contact the vehicle. FIGURE 4b shows the position of the parts with the hood a little lower and switch actuator 43 moved to open switch 37. However, as switch 37 is in the automatic circuit and the manual circuit is now actuated, nothing happens at this point. Next, as shown in FIGURE 4c, switch actuator 41 is moved and the hood down limit switch 35 is opened, which interrupts the circuit to the hood down solenoid of spool valve 55 and returns spool valve 55 to the position shown in FIGURE 5, whereupon downward hood movement ceases.

Manual-automatic switch 73 is then shifted from manual to automatic, so that the unit can no longer be manually operated. Switches 35, 75, 77, 79 and 81 are now inoperative and switches 37 and 39 are the only operative switches and are both open. Switch 37 serves as an automatic down unit leveler, while switch 39 serves as an automatic up unit leveler. If the aircraft or other vehicle, upon being loaded or unloaded, falls or rises more than a predetermined amount from the intermediate position of the hood and the vehicle relative to each other as determined by switch 35, then one or the other of switches 37 and 39 will be actuated to close the associated circuit to move spool valve 53 appropriately to move the gangway in the same direction as the vehicle. Specifically, if the vehicle settles under increased load, then switch 37 (which was opened before switch 35 opened to discontinue downward hood movement) becomes closed, because its associated switch actuator 43 falls to the position shown in FIGURE 4a as the vehicle moves downwardly away from the hood. On the other hand, if the vehicle upon unloading rises undesirably high, then switch actuator 45 is raised which closes switch 39 to energize the unit up solenoid of spool valve 53 to supply fluid under pressure to the upper end of fluid motors 21 to raise the free or outer end of the gangway until switch actuator 45 drops and opens switch 39 and returns spool valve 53 to the position shown in FIGURE 5, whereupon upward movement of the gangway ceases.

It is important to note, therefore, that the position of switch actuator 41 is vertically intermediate the positions of switch actuators 43 and 45, thereby to assure that the rest position of the parts as determined by the opening of hood down limit switch 35 will be spaced between the position of the parts that would actuate either of switches 37 or 39 upon the onset of automatic leveling. The controls of the present invention accordingly can tolerate a certain movement of the vehicle without response by the gangway, so that the gangway does not "hunt" back and forth between positions extremely closely spaced on opposite sides of the desired mid-position of the gangway relative to the vehicle.

When it is desired to discontinue communication between the gangway and the vehicle, as at the conclusion of a loading or unloading operation, then the folding doors (not shown) of the vestibule are closed and manual-automatic switch 73 is moved back to the manual position. A hood up switch 83 is then manually closed, which actuates the hood up solenoid of spool valve 55 to supply fluid under pressure to the forward end of fluid motor 27 to raise the hood to its highest position. Thereafter, gangway 1 may be bodily retracted so that it retreats a substantial distance from the vehicle, after which the vehicle can be removed.

With the circuit as thus far described, if an operator ignorantly or carelessly throws switch 73 into automatic position while the loader is not adjacent to an aircraft, the normal functioning of switch 35 will cause the loader to move downwardly with the possibility of injuring personnel or damaging adjacent structures or the equipment itself. To prevent this the armature of switch 35 carries a second pair of contact elements 36 which are normally in open position and are moved into closed position by the same movement of the switch armature that opens the previously described contacts. As shown in FIGURE 5 an automatic interlock circuit is connected to this second pair of contacts 36 so that with wheel 41 out of contact with the sealing strips 47, the automatic circuit is maintained open by this automatic interlock switch even though manual switch 73 is thrown onto automatic. On the other hand if the loader is properly positioned adjacent an aircraft, contact of the sealing strips 47 with the fuselage of the aircraft as in FIGURE 4c will close the automatic interlock circuit while at the same time opening the Hood Down limit switch. In such case throwing switch 73 from the manual to the automatic position will not result in movement of the loader since the Hood Down limit switch is open and the leveling switches will not have been actuated by movement of the aircraft.

From a consideration of the foregoing disclosure, therefore, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. A conveyance gangway comprising:
 (a) power driven means for moving the gangway up or down to a desired position relative to a doorway of a conveyance,
 (b) support means carried by the gangway and movable relative to the gangway,
 (c) means for moving support means (b) along a path having a component in the direction of the conveyance to place support means (b) in a position contiguous to a nonvertical surface of the conveyance,
 (d) first movement indicator means carried by support means (b) and positioned to be actuated by relative vertical movement between support means (b) and the conveyance in one direction after support means (b) has moved into the position of contiguity to the nonvertical surface of the conveyance,
 (e) second movement indictaor means carried by support means (b) and positioned to be actuated by relative vertical movement between support means (b) and the conveyance in the opposite direction after support means (b) has moved into the position of contiguity to the nonvertical surface of the conveyance,
 (f) first control means operable in response to actuation of the first movement indicator means to operate the power driven means (a) to cause movement of the gangway in one vertical direction,
 (g) second control means operable in response to actuation of the second movement indicator means to operate the power driven means (a) to cause movement of the gangway in the opposite vertical direction, and
 (h) means associated with means (c) blocking operation of control means (f) prior to and during movement of support means (b) into the position of contiguity to the nonvertical surface of the conveyance.

2. A conveyance gangway as claimed in claim 1 in which there are
 (a) limit movement indicator means carried by support means (b) and positioned to be actuated upon movement of support means (b) into the position of contiguity to the nonvertical surface of the conveyance, and
 (b) limit control means operable in response to actuation of the limit movement indicator means to stop movement of means (c) upon support means (b) reaching said position of contiguity.

3. A conveyance gangway as claimed in claim 2 in which there are
 (a) means for deactivating the first and second control means while at the same time activating the limit control means, and (b) means for deactivating the limit control means while activating the first and second control means.

4. A conveyance gangway comprising:
 (a) power driven means for moving the gangway up or down to a desired position relative to a doorway of a conveyance,
 (b) support means carried by the gangway movable relative to the gangway,
 (c) conveyance contacting means carried by support means (b) movable relative to support means (b) in a direction having a vertical component from a normal position of repose relative to support means (b) in which it projects toward the conveyance to first and second operative positions spaced from the position of repose,
 (d) means for moving support means (b) along a path having a component in the direction of the conveyance to cause conveyance contacting means (c) to contact a nonvertical surface of the conveyance,
 (e) means constraining the conveyance contacting means on further movement of support means (b) along said path to move from the position of repose through and past the first operative position into an intermediate position between the first and second operative positions,
 (f) first movement indicator means carried by support means (b) and positioned to be actuated upon conveyance contacting means (c) assuming the first operative position and being deactivated upon conveyance contacting means (c) moving toward the intermediate position,
 (g) second movement indicator means carried by support means (b) positioned to be actuated upon conveyance contacting means (c) assuming the second operative position and deactivated upon conveyance contacting means (c) moving toward the intermediate position,
 (h) first control means operable in response to actuation of the first movement indicator means to operate the power driven means (a) to cause movement of the gangway in one vertical direction, and
 (i) second control means operable in response to actuation of the second movement indicator means to operate the power driven means (a) to cause movement of the gangway in the opposite vertical direction.

5. A conveyance gangway as claimed in claim 4 in which:
 (a) conveyance contacting means (c) comprises a resilient weather sealing strip for contacting the conveyance above the doorway.

6. A conveyance gangway as claimed in claim 4 in which:
 (a) support means (b) comprises a weather protective hood pivotally mounted at the conveyance end of the loader, the first control means causes downward movement and the second control means causes upward movement.

7. A conveyance gangway as claimed in claim 4 in which:
 (a) means associated with means (d) blocks operation of first control means (h) during movement of the convergence contacting means past the first operative position toward the intermediate position.

8. A conveyance gangway as claimed in claim 4 in which:
 (a) movement indicator means (f) and (g) comprise mechanical elements biased toward a normal position and movable away from normal position by movements of conveyance contacting means (c), and
 (b) control means (h) and (i) each comprise switch means.

9. A conveyance gangway as claimed in claim 8 in which:
 (a) the switch means of control means (h) is in closed position when movement indicator means (f) is in normal position, and
 (b) the switch means of control means (i) is in open position when movement indicator means (g) is in normal position.

10. A conveyance gangway comprising:
 (a) power driven means for moving the gangway up or down to a desired position relative to a doorway of a conveyance,
 (b) support means carried by the gangway and movable relative to the gangway,
 (c) means contraining the movement of the support means along a path toward a conveyance and into a position of contiguity with a nonvertical surface of the conveyance,
 (d) power driven means for moving support means (b) along the path and into the position of contiguity with a conveyance,
 (e) conveyance contacting means carried by support means (b) movable to positions between and including a lower position and a higher position by relative vertical movement of the conveyance and support means (b),
 (f) downward movement indicator means carried by support means (b) actuated by movement of the conveyance contacting means into the lower position,
 (g) upward movement indicator means carried by the support means (b) actuated by movement of the conveyance contacting means into the higher position,
 (h) limit movement indicator means carried by the support means actuated by movement of the conveyance contacting means into a position intermediate the lower position and the higher position,
 (i) downward control means operable in response to actuation of the downward movement indicator means to operate the power driven means (a) to cause downward movement of the gangway,
 (j) upward control means operable in response to actuation of the upward movement indicator means to operate the power driven means (a) to cause upward movement of the gangway,
 (k) limit control means operable in response to actuation of the limit movement indicator means to deactivate power driven means (c),
 (l) means for deactivating the upward and downward control means while at the same time activating the limit control means, and
 (m) means for deactivating the limit control means while activating the upward and downward control means.

11. A conveyance gangway as claimed in claim 10 in which
 (a) means are associated with limit movement indicator means (h) which block operation of at least one of control means (i) and (j) whenever means (m) activate the control means (i) and (j) with limit movement indicator means (h) not actuated.

References Cited by the Examiner
UNITED STATES PATENTS 3,038,185  6/1962  Moore _____ 14—71
3,099,847  8/1963  Lodjic _____ 14—71

CHARLES E. O'CONNELL, Primary Examiner.

N. C. BYERS, Assistant Examiner.